J. HOPKINSON.
KNIFE EDGE BEARING.
APPLICATION FILED JUNE 16, 1911.
1,067,341.
Patented July 15, 1913.
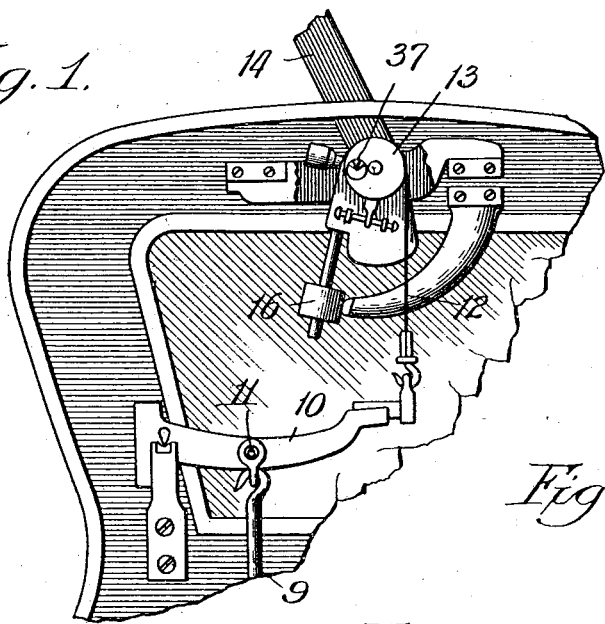
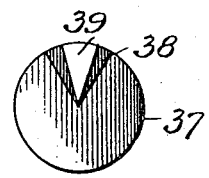
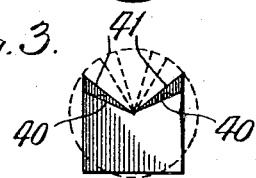
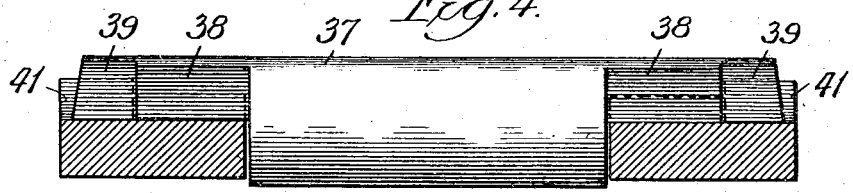
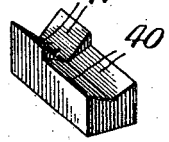
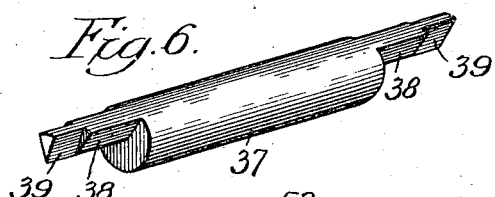
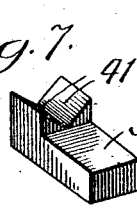
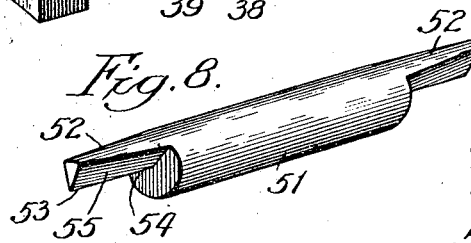
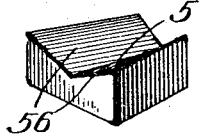
Witnesses:
John Enders
Henry A. Parks
Inventor:
Joseph Hopkinson,
by Sheridan, Wilkinson, Scott & Richmond.
Attys.

UNITED STATES PATENT OFFICE.

JOSEPH HOPKINSON, OF DAYTON, OHIO.

KNIFE-EDGE BEARING.

1,067,341.   Specification of Letters Patent.   Patented July 15, 1913.

Application filed June 16, 1911. Serial No. 633,576.

*To all whom it may concern:*

Be it known that I, JOSEPH HOPKINSON, a citizen of the United States, residing at Dayton, in the county of Montgomery and State of Ohio, have invented certain new and useful Improvements in Knife-Edge Bearings, of which the following is a specification.

The object of my invention is to provide an improved knife edge bearing for use in weighing scales and adapted for use also in any connection in which it is desired that a moving part of a mechanical structure be so mounted as to be sensitive to the application of a force of small magnitude.

I will direct the description of my invention to its application to a weighing scale.

In weighing scale structures it is the almost universal practice to provide the moving parts with fulcrums in the form of a knife edge coacting with a bearing, the knife edge being usually constructed of steel and the coacting bearing of some other hard substance such as agate, or hardened steel.

As a result of long experience, scale makers have found that knife edges formed to an angle of about 60 degrees resting upon bearings having a notch, the sides of which diverge at about 100 degrees, give the best results. Of course, more or less variation from these precise angles is found in practice, but the variation is limited by two conditions. If the angle of the knife edge is made too acute it will wear away rapidly, thus interfering with the sensitiveness of the scale and also altering the proper relation of the different parts. If the notch in the bearing plate upon which the knife rests is formed at too wide an angle the knife edge when rotated to a considerable extent will slip from its proper position.

In certain instances, especially in the construction of pendulum scales, it is necessary to provide for a wider range of angular movement between the knife edge and its bearing than is possible when the knife edge is constructed with the approved degree of acuteness. In order to secure a sufficient degree of relative rotation between the knife edge and its bearing however, it has heretofore been found necessary to reduce the angle of the knife edge down to about 30 degrees, thus introducing an objectionable degree of wear. It will be obvious, of course, that the sharper or more acute the knife edge is made the more rapidly will the use of the structure wear the knife edge toward its base. In the pendulum scale this rapid wear is objectionable for the reason that it increases the length of the pendulum, thereby destroying the accuracy of the scale. In the pendulum scale, however, it is necessary to secure a degree of angular movement of the pendulum which has heretofore rendered it impossible to employ a knife edge with an angle of much over 30 degrees. The greater angular movement desired could not be secured by increasing the angle of the notch in the bearing with which the knife edge coacts, for the reason that an increase of this angle beyond the limits of the usual practice would result in the knife edge slipping out of its seat at the apex of the angle in its bearing when the knife edge was rotated to an extreme position.

The object of my invention is to construct a knife edge and bearing of such form that the knife edge may have the usual approved angle of about 60 degrees and still have a large extent of angular movement without danger of slipping from its seat in the bearing. The means whereby I accomplish this object will more clearly appear from the following description and claims, taken in connection with the accompanying drawings, in which—

Figure 1 is an elevation view of part of a pendulum scale of the type illustrated and described in Patent No. 867,671, granted on October 8, 1907, to O. O. Ozias and J. Hopkinson, and illustrates a type of mechanism to which my invention is applicable. Fig. 2 is an end view of a knife edge member constructed according to my invention and adapted to form a part of the pendulum illustrated in Fig. 1. Fig. 3 is an end view of a bearing adapted to coact with the knife edge member shown in Fig. 2. Fig. 4 is a side view of the knife edge member and its bearing, the bearing being shown in central longitudinal section. Fig. 5 is a perspective view of the bearing illustrated in Fig. 3. Fig. 6 is a perspective view of the knife edge member illustrated in Figs. 2 and 4. Fig. 7 is a perspective view of a modified form of bearing. Fig. 8 is a perspective view of a modified form of knife edge member. Fig. 9 is a perspective view of a bearing adapted to be used in connection with the knife edge member shown in Fig. 8.

The type of scale illustrated in Fig. 1 is explained in full in the patent to O. O.

Ozias and J. Hopkinson referred to above, and an extended explanation thereof is unnecessary in this application. It is sufficient to state that the article to be weighed is placed upon a platform connected by a lever or system of levers with the link 9. The downward pull imposed upon the link 9 by the article being weighed is transmitted to the lever 10 through the knife edge 11 and is transmitted from the lever 10 to the flexible band 12 which is wound about and secured to the disk 13. The pendulum 16 is rigid with the disk 13 and the knife edges 37 projecting from the disk 13 rest upon suitable bearings secured to the frame of the scale. It will be apparent that the weight of an article placed upon the scale and drawing down upon the link 9 will cause the pendulum to rotate upon its knife edges 37 in a clockwise direction and that the amount of rotation imparted to the pendulum will bear a definite relation to the weight of the article being weighed. Secured to the disk 13 is an indicating hand 14 through which the weight and value of the article being weighed are ascertained, as explained in the patent to Ozias and Hopkinson referred to above.

Referring to the form of my invention illustrated the knife edge member 37 is provided with knife edges, the part 38 of which is of standard angle and the part 39 having a reduced angle. The bearing which supports the knife edge element 37 is illustrated in Figs. 3, 4 and 5 and takes the form of a bearing plate of agate or other hard material having a notch defined at one end by planes 40 forming an angle with each other sufficient to permit the requisite angular movement of the knife edge 38, and at the other end defined by planes 41 which form a more acute angle adapted to receive and permit the necessary amount of angular movement of the part 39 of the proper edge. The part 38 of the knife edge, being of standard width, the angle formed by the planes 40 in which the knife edge 38 rests is too obtuse to restrain the knife edge member 37 against movement transversely of the knife edge, but the angle defined by the planes 41 is sufficiently acute to restrain such transverse movement by reason of the engagement therewith of the acute angled part 39 of the knife edge. The use of the acute angled part 39 of the knife edge is not objectionable, for the reason that the acute angle of the part 39 cannot wear down more rapidly than does the more obtuse angle of the part 38. This device, therefore, possesses the advantages of both the standard angle knife edge in its resistance to wear and the advantage of the cut down angle knife edge in permitting the wide angular movement necessary in a pendulum scale.

In Fig. 7 I have illustrated a form of bearing adapted for use with the knife edge member 37 illustrated in the preceding views. The bearing illustrated in Fig. 7 has a notch defined by planes 41' corresponding to the notch defined by the planes 41 in the bearing previously described and is provided with a plane surface 50 instead of the notch defined by the planes 40 illustrated in Fig. 5. The knife edge member shown in Fig. 6 may be used with the form of bearing illustrated in Fig. 7, the part 38 of the knife edge resting upon the plane surface 50 and the part 39 of the knife edge being received in the notch defined by the planes 41'. It will be understood, of course, that the vertex of the angle formed by the planes 41' is in alinement with the plane surface 50.

In Figs. 8 and 9 I have illustrated another modification in which the knife edge element 51 is provided with knife edges 52, the angle of which progressively diminishes or grows more acute from one end to the other. As illustrated in Fig. 8 the angle at the point designated by the numeral 53 may be quite acute and gradually grow more obtuse toward the point designated by the numeral 54, at which latter point the angle may be of standard approved width. This form of knife edge differs from that previously described, in that instead of two distinct parts of different angularity, the surfaces 55 defining the knife edge are so formed as to gradually reduce the angle of the edge from the point 54 toward the point 53. The bearing illustrated in Fig. 9 is adapted to coact with the knife edge element shown in Fig. 8, and the notch in this bearing is defined by planes 56 so formed that the angle along the vertex 57 gradually diminishes from one end toward the other. The structure shown in Figs. 8 and 9 has the advantages described in connection with the modification previously referred to.

While I have referred to the knife edge elements and bearings herein described as being applied to the pendulum of the scale partially illustrated in Fig. 1, it will be obvious that either the knife edge or its bearing may be attached to any moving and stationary parts of a scale structure between which a wider degree of rotation is desired than would be permitted by the use of knife edges of standard angle employed with bearings of the type heretofore in use.

It will also be apparent that considerable variation may be made in the precise form of the elements herein described without departing from the spirit of my invention.

I claim:

1. In a device of the class described, a knife edge having parts of its bearing edge of different degrees of acuteness, a bearing for said knife edge having a notch coacting with the more acute part of the bearing edge of said knife edge.

2. In a device of the class described, a knife edge of different degrees of acuteness in different parts, a bearing having a notch the sides of which meet at angles of different degrees in different parts, the more acute and less acute parts of said knife edge coacting, respectively, with the more acute and less acute parts, respectively, of said bearing notch.

3. In a device of the class described, a pendulum, a knife edge and bearing supporting said pendulum, the bearing edge of said knife edge having parts of different degrees of acuteness, and said bearing for said knife edge having a notch coacting with the more acute part of the bearing edge of said knife edge.

4. In a device of the class described, a pendulum, a knife edge and bearing supporting said pendulum, said knife edge being of different degrees of acuteness in different parts, and a bearing having a notch the sides of which meet at angles of different degrees in different parts, the more acute and less acute parts of said knife edge coacting, respectively, with the more acute and less acute parts, respectively, of said bearing notch.

In testimony whereof, I have subscribed my name.

JOSEPH HOPKINSON.

Witnesses:
JAMES L. BOURNE,
CARL S. COOK.